(12) United States Patent
Babcock et al.

(10) Patent No.: US 11,149,183 B2
(45) Date of Patent: Oct. 19, 2021

(54) HYDROCARBON BASED CARRIER FLUID

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US); Kevin G. Watts, Houston, TX (US)

(73) Assignee: Linde Aktiengesellschaft, Munich (DE)

(*) Notice: Subject to any disclaimer, the term of this patent is extended or adjusted under 35 U.S.C. 154(b) by 249 days.

(21) Appl. No.: 15/400,345

(22) Filed: Jan. 6, 2017

(65) Prior Publication Data

US 2017/0292057 A1    Oct. 12, 2017

Related U.S. Application Data

(60) Provisional application No. 62/319,848, filed on Apr. 8, 2016.

(51) Int. Cl.
| | |
|---|---|
| *C09K 8/524* | (2006.01) |
| *C09K 8/52* | (2006.01) |
| *C09K 8/60* | (2006.01) |
| *C09K 8/94* | (2006.01) |
| *E21B 37/06* | (2006.01) |
| *C09K 8/82* | (2006.01) |

(52) U.S. Cl.
CPC ............... *C09K 8/524* (2013.01); *C09K 8/52* (2013.01); *C09K 8/602* (2013.01); *C09K 8/82* (2013.01); *C09K 8/94* (2013.01); *E21B 37/06* (2013.01); *C09K 2208/10* (2013.01)

(58) Field of Classification Search
None
See application file for complete search history.

(56) References Cited

U.S. PATENT DOCUMENTS

| | | |
|---|---|---|
| 3,035,637 A | 5/1962 | Allen |
| 3,316,965 A | 5/1967 | Watanabe |
| 3,319,712 A | 5/1967 | O'Brien |
| 3,368,627 A | 2/1968 | Hurst et al. |
| 4,490,985 A | 1/1985 | Wells |
| 4,511,381 A | 4/1985 | Mehra |
| 6,230,814 B1 | 5/2001 | Nasr et al. |
| 7,373,790 B2 | 5/2008 | Clare et al. |
| 8,505,332 B1 | 8/2013 | Prim |
| 8,844,639 B2 | 9/2014 | Gupta et al. |

(Continued)

FOREIGN PATENT DOCUMENTS

| | | |
|---|---|---|
| DE | 102014010105 A1 | 1/2016 |
| GB | 2219818 A | 12/1989 |

(Continued)

OTHER PUBLICATIONS

Ethane EOR; 2015; IRT Inc.; http://www.irt-inc.com/ethane.html (Year: 2015).*

(Continued)

*Primary Examiner* — Anuradha Ahuja
(74) *Attorney, Agent, or Firm* — Patterson + Sheridan, LLP (57) ABSTRACT

Y-grade NGL or L-grade is used as a carrier fluid to transport one or more chemical additives into a hydrocarbon bearing reservoir to treat the hydrocarbon bearing reservoir. The Y-grade NGL or L-grade and the chemical additives may be chilled and/or foamed.

18 Claims, 5 Drawing Sheets

(56) References Cited

U.S. PATENT DOCUMENTS

| | | |
|---|---|---|
| 8,869,889 B2 | 10/2014 | Palmer et al. |
| 9,488,040 B2 | 11/2016 | Chakrabarty et al. |
| 9,534,836 B2 | 1/2017 | Dubettier-Grenier et al. |
| 2003/0047309 A1* | 3/2003 | Thomas .............. E21B 41/0064 166/265 |
| 2005/0189112 A1 | 9/2005 | Taylor et al. |
| 2006/0289166 A1 | 12/2006 | Stromquist et al. |
| 2007/0000666 A1 | 1/2007 | Vozniak et al. |
| 2007/0187340 A1 | 8/2007 | Oresti et al. |
| 2008/0087041 A1 | 4/2008 | Denton et al. |
| 2010/0251763 A1* | 10/2010 | Audun .................... B63B 25/16 62/614 |
| 2012/0000660 A1 | 1/2012 | Gatlin et al. |
| 2012/0047942 A1 | 3/2012 | Kolodziej |
| 2013/0048288 A1* | 2/2013 | Manrique .............. C09K 8/602 166/300 |
| 2013/0168086 A1 | 7/2013 | Roberts |
| 2013/0220605 A1 | 8/2013 | Vandor |
| 2013/0299167 A1* | 11/2013 | Fordyce .................. E21B 43/26 166/280.1 |
| 2014/0000899 A1 | 1/2014 | Nevison |
| 2014/0124208 A1 | 5/2014 | Loree et al. |
| 2014/0262292 A1* | 9/2014 | Joseph .................... E21B 43/26 166/308.1 |
| 2014/0366577 A1 | 12/2014 | Zubrin et al. |
| 2015/0007981 A1* | 1/2015 | Shomody ................ E21B 36/00 166/245 |
| 2015/0021022 A1 | 1/2015 | Ladva et al. |
| 2015/0060075 A1* | 3/2015 | Blom .................... E21B 43/168 166/307 |
| 2015/0152318 A1 | 6/2015 | Travis |
| 2015/0167550 A1 | 6/2015 | Vandervort et al. |
| 2015/0184932 A1 | 7/2015 | Higginbotham et al. |
| 2015/0233222 A1 | 8/2015 | Teklu et al. |
| 2015/0368566 A1 | 12/2015 | Young et al. |
| 2016/0369611 A1* | 12/2016 | Bragg ..................... E21B 43/40 |
| 2017/0283688 A1* | 10/2017 | Valencia .................. C09K 8/58 |

FOREIGN PATENT DOCUMENTS

| | | |
|---|---|---|
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

M. Asadi et al., "Water-Free Fracturing: A Case History", Society of Petroleum Engineers, SPE-175988-MS, 14 Pages, 2015.

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

Holtz et al., "Summary Integrated Geologic and Engineering Determination of Oil- Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

International Search Report and Written Opinion dated Apr. 4, 2017, corresponding to Application No. PCT/US2017/012566.

* cited by examiner

HYDROCARBON BASED CARRIER FLUID

CROSS-REFERENCE TO RELATED APPLICATION

This application claims priority to U.S. Provisional Application Ser. No. 62/319,848, filed Apr. 8, 2016, which is incorporated by reference herein in its entirety.

BACKGROUND

Field

Embodiments of the disclosure relate to transporting one or more chemicals using a hydrocarbon based carrier fluid. More particularly, it relates to using an unfractionated hydrocarbon mixture (such as Y-Grade NGL or L-Grade) as a carrier fluid to transport one or more chemical additives into a hydrocarbon bearing reservoir to improve or remediate productivity issues.

Description of the Related Art

Flow restrictions in oil and gas wells tend to reduce the production rate over a period of time. Typically, the fluid flowing from a hydrocarbon bearing reservoir leaves behind solid residues, both inorganic and organic, in a portion of the formation proximate the well and in tubing, piping, valves, and the like which form the well structure.

In the operation of a well, there are many processes which may act to reduce production from the well. Hydrocarbon production is typically limited by two major reservoir factors: porosity and permeability. Even if the porosity is adequate, the effective permeability to the hydrocarbon flow may be limited. When more than one fluid is present in a permeable system, the flow of each is affected by the amount and distribution of the other(s); in particular the relative flows or relative permeability are affected by which fluid is the "wetting" phase, that is the fluid that wets the surfaces of the reservoir rock. Aqueous-based fluid injected during well treatments may saturate the pore spaces of the treated region, preventing the migration of hydrocarbon into and through the same pore spaces.

Drilling fluids may contain chemicals which can reduce the ability of the formation to produce fluids by reacting with the formation and/or formation fluids to produce precipitates and/or scale. Retrograde condensation may cause a condensate ring to accumulate near wellbore resulting in significant reduction in hydrocarbon flowrate. The deposition of scale, asphaltenes, and paraffin's may also inhibit flow. Furthermore, certain fluids may react with clays within the formation to causing them to swell, further blocking the formation's ability to flow. As conventional examples, solvents are used to remove paraffin and asphaltene deposits; surfactants are used to modify formation wettability, modify capillary forces to increase oil mobility, and to eliminate near wellbore condensate blockage; acids are used to remove skin damage; and polymers are used to modify water viscosity to improve sweep or divert fluid flow within the subsurface reservoir.

In some instances, chemical treatments require a "carrier fluid" and/or a displacement fluid to transport the chemical treatment and place it at the appropriate location in the wellbore or subsurface formation. There is a need for methods to carry in suspension and transport chemical compositions for cleaning wellbore and near-wellbore areas from damage related to drilling, work over operations and degradation of the near wellbore and subsurface formation especially in low pressure formations. There is an additional need to perform cleaning in a manner such that an operator may precisely control the location of the remedial chemical treatment.

SUMMARY

A method of transporting a chemical additive to a hydrocarbon bearing reservoir comprises mixing the chemical additive with a carrier fluid to form a treatment fluid, wherein the carrier fluid includes an unfractionated hydrocarbon mixture, and pumping the treatment fluid into the hydrocarbon bearing reservoir.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the disclosure include carrier fluids used to transport one or more chemical additives (e.g. chemical compositions) into a hydrocarbon bearing reservoir. One or more of the carrier fluids may comprise an unfractionated hydrocarbon mixture, such as Y-Grade natural gas liquids (referred to herein as Y-Grade NGL) or L-Grade fluids (referred to herein as L-Grade).

Y-Grade NGL is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of de-methanized hydrocarbon streams that are produced from shale wells and transported to a centralized facility. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane, 15-45%, such as 20-35%, for example 27%, propane, 5-10%, for example 7%, normal butane, 5-40%, such as 10-25%, for example 10%, isobutane, and 5-25%, such as 10-20%, for example 13%, pentane plus. Methane is typically less than 1%, such as less than 0.5% by liquid volume.

In one embodiment, Y-Grade NGL comprises dehydrated, desulfurized wellhead gas condensed components that have a vapor pressure of not more than about 600 psig at 100 degrees Fahrenheit (° F.), with aromatics below about 1 weight percent, and olefins below about 1% by liquid volume. Materials and streams useful for the embodiments described herein typically include hydrocarbons with melting points below about 0 degrees Fahrenheit (° F.).

In one embodiment, Y-Grade NGL may be mixed with a viscosity increasing agent, a nonionic surfactant, and/or a crosslinking agent. Y-Grade NGL may be mixed with the nonionic surfactant to create foam. The viscosity increasing agent, the nonionic surfactant, and/or the crosslinking agent may be mixed with a solubilizing fluid for subsequent mixture with the Y-Grade NGL. The solubilizing fluid may comprise fractionated or refined hydrocarbons, such as $C_3$, $C_4$, $C_5$, $C_6$, $C_7$, $C_8$, $C_9$, and mixtures thereof. The solubilizing fluid may comprise C3+ hydrocarbons, including propane, butane, pentane, naphtha, toluene, diesel, natural gasoline, and any combination thereof.

The advantages of using Y-Grade NGL as a carrier fluid is that the fluid is devoid of free water and available at lower cost compared to other waterless alternatives that are currently employed (such as super critical state $CO_2$), is 100 percent compatible with subsurface hydrocarbon bearing formations, is a natural solvent, and is fast to clean-up as it is energized by the lighter hydrocarbon components (such as $C_2$ & $C_3$).

L-Grade is an unfractionated hydrocarbon mixture comprising natural gas liquids, condensate (including aromatics), and traces of water, carbon dioxide, nitrogen, and/or hydrogen sulfide. The natural gas liquids in the L-Grade mixture comprise ethane, propane, butane, isobutane, and pentane plus. Pentane plus comprises pentane, isopentane, and/or heavier weight hydrocarbons, for example hydrocarbon compounds containing C5 through C35. Pentane plus may include natural gasoline for example.

Typically, L-Grade is a by-product of de-methanized hydrocarbon streams that are produced from shale wells and transported to a centralized facility. L-Grade typically includes natural gas liquids and condensate with an API gravity ranging between 50 degrees and 75 degrees. In its un-fractionated or natural state (under certain pressures and temperatures, for example within a range of 250-600 psig and at wellhead or ambient temperature) L-Grade has no dedicated market or known use. L-Grade must undergo processing before its true value is proven.

L-Grade differs from condensate in that L-Grade is stored at a pressure between about 230 psig to about 600 psig, whereas condensate is stored at atmospheric conditions (e.g. pressure and temperature).

L-Grade can be recovered from a hydrocarbon stream that is collected from the wellhead or production header of one or more unconventional resource wells, typically referred to as shale wells, via flash separation at pressures that are typically below 600 psig. This is accomplished by utilizing flash separation operated at low enough pressure to reject the vast majority of methane from the hydrocarbon stream, but at high enough pressure to retain a significant portion of the ethane plus mixture.

Figure 1:
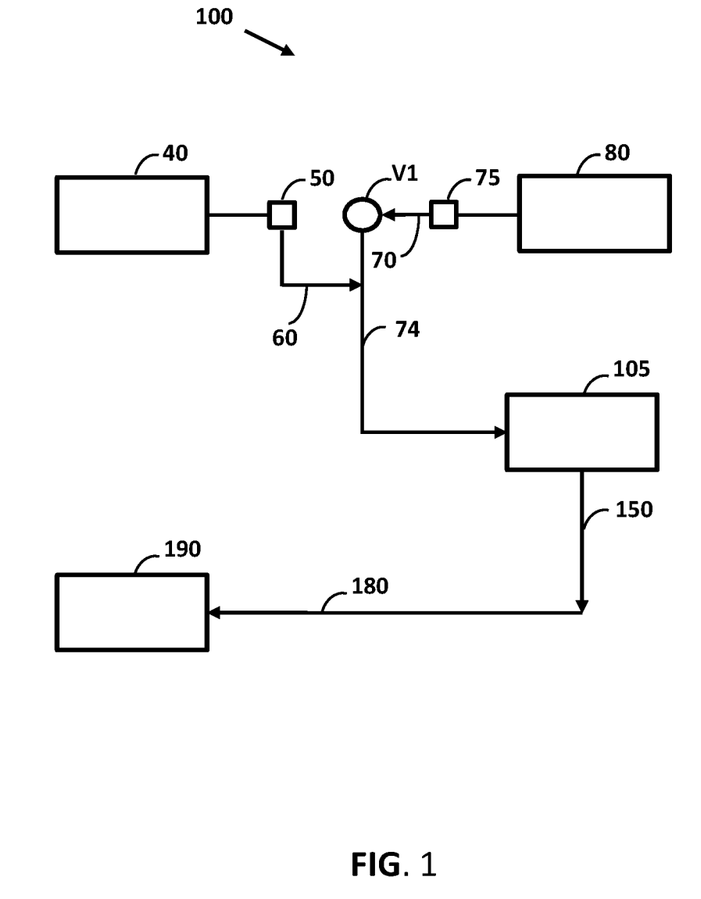
FIG. 1 shows a plan schematic of a carrier fluid system according to one embodiment.

FIG. 1 is a plan view of a carrier fluid system 100 according to one embodiment. The carrier fluid system 100 includes a carrier fluid storage unit 80, a chemical additive unit 40, and one or more high pressure pumps 105. A carrier fluid, such as an unfractionated hydrocarbon mixture (e.g. Y-Grade NGL or L-Grade), from the carrier fluid storage unit 80 is pumped to a control valve V1 through piping 70 by a pump 75 and into piping 74.

A chemical additive from the chemical additive unit 40 is pumped through piping 60 by a dosing pump 50 into piping 74. Although only one chemical additive unit 40 is shown, the carrier fluid system 100 may include any number of chemical additive units 40 containing the same or different chemical additives, all of which are pumped into piping 74 for mixture with the carrier fluid. The chemical additive may be a solvent, a surfactant, a non-ionic surfactant, a polymer, an acid, a nano-surfactant, a nano-polymer, a polymer coated nano-particle, a nano-solvent, or any combination thereof.

The carrier fluid mixes with the chemical additive in piping 74 to form a treatment fluid. The treatment fluid is transferred from piping 74 into the one or more high-pressure pumps 105. Any convenient pump may be used as the high-pressure pumps 105. The high-pressure pumps 105 boost the pressure of the carrier fluid to a pressure of 250 psig or more, such as 250 psig to 10,000 psig, for example about 10,000 psig, and pumps the treatment fluid through piping 150 into piping 180, and from piping 180 into a wellhead 190 (and through carbon steel tubing, stainless steel tubing, coiled tubing, or capillary tubing for example) for injection into a subsurface formation.

Figure 2:
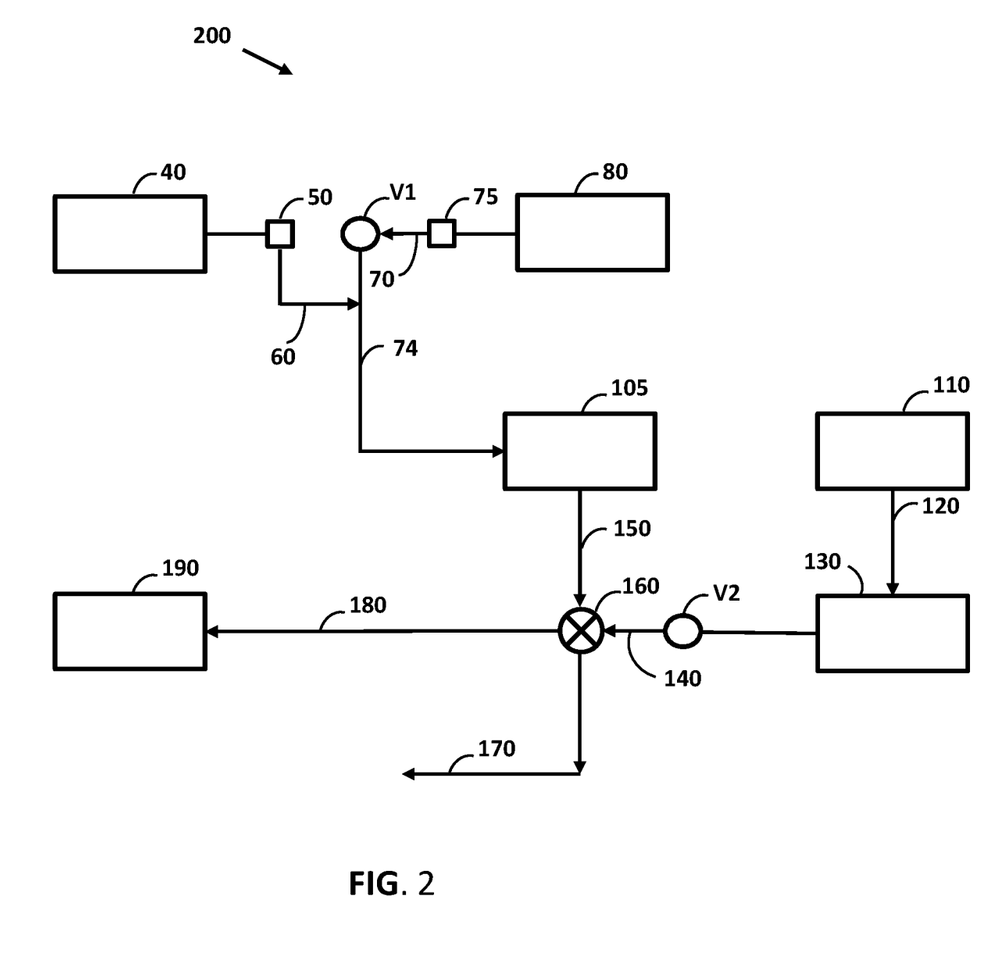
FIG. 2 shows a plan schematic of a carrier fluid system according to one embodiment.

FIG. 2 is a plan view of a carrier fluid system 200 according to one embodiment. The carrier fluid system 200 is similar to the carrier fluid system 100 but further includes a cooler 160, a liquid nitrogen source 110, and one or more cryogenic pumps 130. The treatment fluid flows from piping 150 through the cooler 160 to piping 180. Liquid nitrogen (from the liquid nitrogen source 110) flowing through the cooler 160 cools the pressurized treatment fluid to a temperature of 0° F. or lower, for example as low as −60° F. The cooler 160 may be a shell-and-tube cooler, a tube-in-tube cooler, or other similar design, and is typically cooled by thermal contact with liquid nitrogen.

Liquid nitrogen from the liquid nitrogen source 110, which may be a liquid nitrogen storage unit, is transferred through piping 120 by one or more cryogenic pumps 130. The cryogenic pumps 130 discharge liquid nitrogen through piping 140 to a control valve V2, and from the control valve V2 into the cooler 160 to cool the pressurized treatment fluid that is flowing through the cooler 160. The low temperature, pressurized treatment fluid discharges from the cooler 160 into piping 180 and is pumped to the wellhead 190 for injection into a subsurface formation. Liquid nitrogen that is vaporized in the cooler 160 is discharged to a nitrogen vent through piping 170.

The cryogenic components of the carrier fluid system 200, such as the liquid nitrogen source 110, the cryogenic pumps 130, the control valve V2, the cooler 160, and piping 120, 140, 150, 170, and/or 180 may be made of material resistant to low temperatures and/or may be insulated to avoid heat uptake and to enhance safety of operating personnel. Such low temperature resistant materials may include, but are not limited to, carbon steel, stainless steel, nickel, Inconel, and austenitic stainless steel. Supplemental cooling may also be included with any insulation or jacketing by routing tubing or piping through the insulation, or between the insulation and the equipment, and providing additional liquid nitrogen through the tubing or piping.

Figure 3:
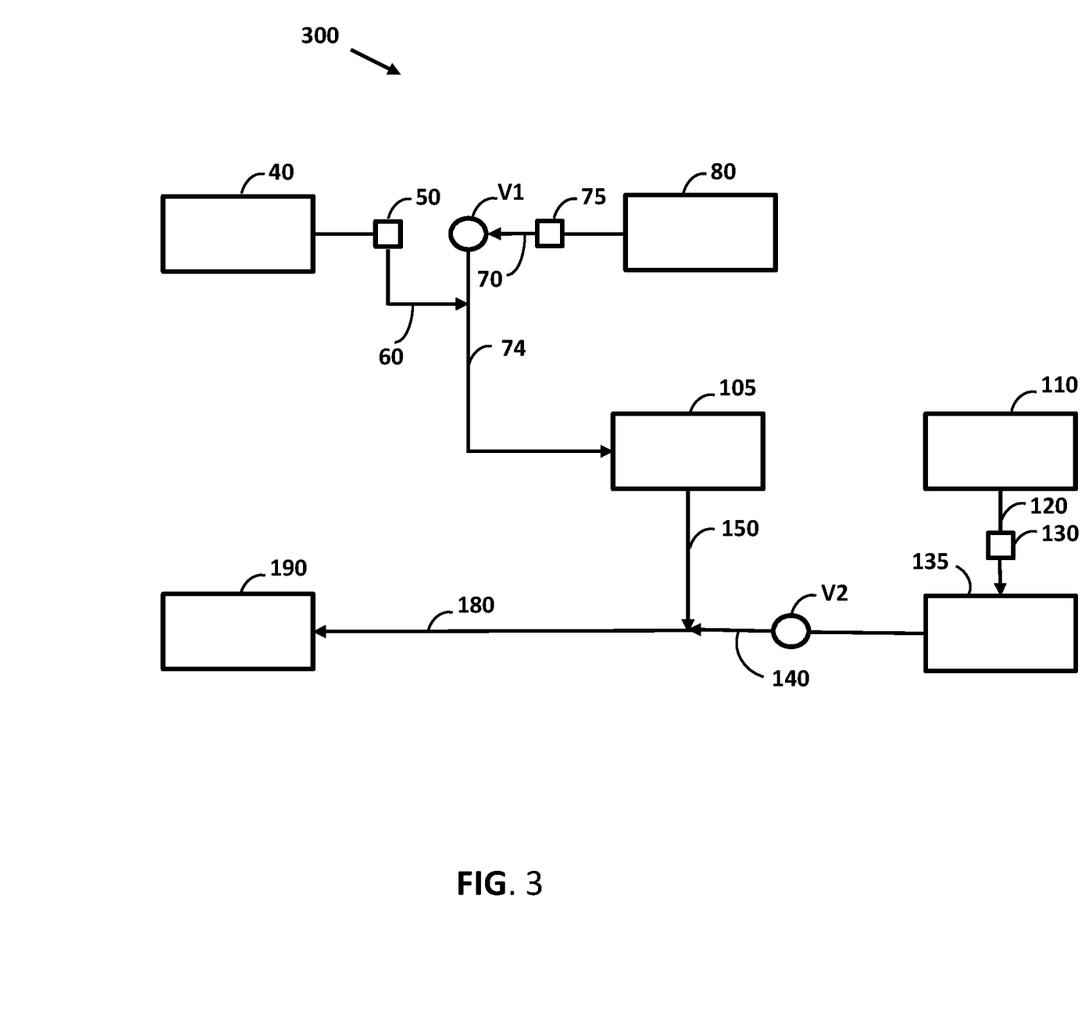
FIG. 3 shows a plan schematic of a carrier fluid system according to one embodiment.

FIG. 3 is a plan view of a carrier fluid system 300 according to one embodiment. The carrier fluid system 300 is similar to the carrier fluid system 200 with one difference being that the cooler 160 has been removed and a vaporizer 135 has been added.

Liquid nitrogen obtained from the liquid nitrogen source 110 is transferred through piping 120 by one or more cryogenic pumps 130, which discharge the liquid nitrogen into the vaporizer 135 where the liquid nitrogen is converted into high pressure gaseous nitrogen. The high pressure gaseous nitrogen is discharged from the vaporizer 135 through the control valve V2 via piping 140 and directly into piping 180, where it mixes with and cools the pressurized treatment fluid flowing from piping 150 to generate foam. The foam (also referred to as the treatment fluid) is then pumped into the wellhead 190 for injection into a subsurface formation.

In one embodiment, the treatment fluid is chilled to a temperature that freezes connate water located in the hydrocarbon bearing reservoir. The frozen water in the reservoir diverts the flow of any additional treatment fluid and allows placement of material at selected locations in the reservoir.

In one embodiment, the treatment fluid (and in particular Y-Grade NGL or L-Grade in the treatment fluid) acts as a solvent to remediate paraffin and/or asphaltene located near wellbore and in the hydrocarbon bearing reservoir. In one embodiment, the treatment fluid (and in particular Y-Grade NGL or L-Grade with a surfactant in the treatment fluid) is used to remediate condensate blockage located in the hydrocarbon bearing reservoir.

In one embodiment, the treatment fluid may comprise a reverse emulsion of 5-10% inhibited water by volume, the Y-grade NGL or L-grade carrier fluid, the chemical additive, and a surfactant.

In one embodiment, carbon dioxide, a non-ionic surfactant, and/or any other cooling agent may be used in place of or in addition to liquid nitrogen as described in the carrier fluid system 200 to chill the treatment fluid.

In one embodiment, carbon dioxide, a non-ionic surfactant, and/or any other foaming agent may be used in place of or in addition to liquid nitrogen as described in the carrier fluid system 300 to chill the treatment fluid and/or generate foam.

In one embodiment, the treatment fluid is used to treat the hydrocarbon bearing reservoir by remediating (e.g. reducing and/or removing) one or more materials from the reservoir. In one embodiment, the treatment fluid is used to displace one or more materials from the reservoir to increase the productivity of the reservoir.

Figure 4:
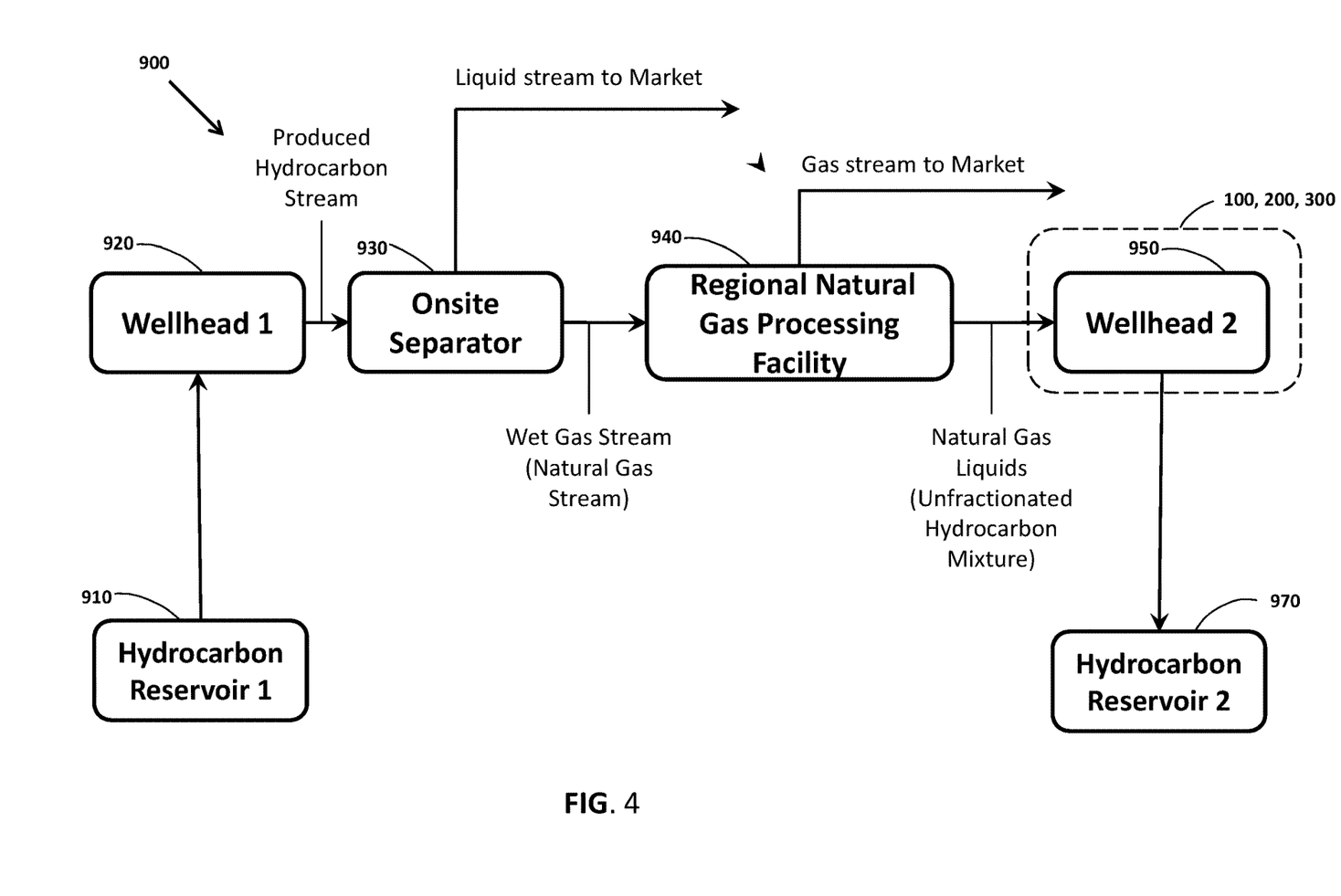
FIG. 4 shows a plan schematic of a Y-Grade NGL recovery system that can be used to create Y-Grade NGL for use in the embodiments described herein.

FIG. 4 shows one embodiment of a Y-Grade NGL recovery system 900 for obtaining Y-Grade NGL that can be used with any of the embodiments described herein. As illustrated in FIG. 4, a stream of hydrocarbons are produced from a first hydrocarbon bearing reservoir 910 to the surface via a first wellhead 920 where the produced hydrocarbon stream is flash separated onsite by an onsite separator 930 into a wet gas stream (also referred to as a natural gas stream) and a liquid stream. The natural gas stream is transported, via pipeline for example, to a regional natural gas processing facility 940 where it is further processed, and the liquid stream is transported to field storage for example where it is sold into the market.

The natural gas stream enters the natural gas processing facility 940 where it is dehydrated and decontaminated of CO2, H2S, and N2. The dehydrated and decontaminated natural gas stream is then expanded and cooled to condense out natural gas liquids. These natural gas liquids ("NGL") are an unfractionated hydrocarbon mixture, which is referred to as Y-Grade NGL, raw mix, or unfractionated NGL. The remaining gas stream is transported to a pipeline for example where it is sold into the market.

The unfractionated hydrocarbon mixture is a liquid mixture that has been condensed from the natural gas stream at the natural gas processing facility 940. The condensation process is the result of expanding and cooling the natural gas stream to condense out the unfractionated hydrocarbon mixture, a process also referred to as de-methanizing the natural gas stream. The unfractionated hydrocarbon mixture is therefore a natural byproduct of a de-methanized hydrocarbon stream.

The unfractionated hydrocarbon mixture is then transported via a pipeline for example to a targeted reservoir for use as a carrier fluid as described herein. The carrier fluid may be injected via a second wellhead 950 (such as wellhead 190) into a second hydrocarbon bearing reservoir 970 using the embodiments described herein.

Figure 5:
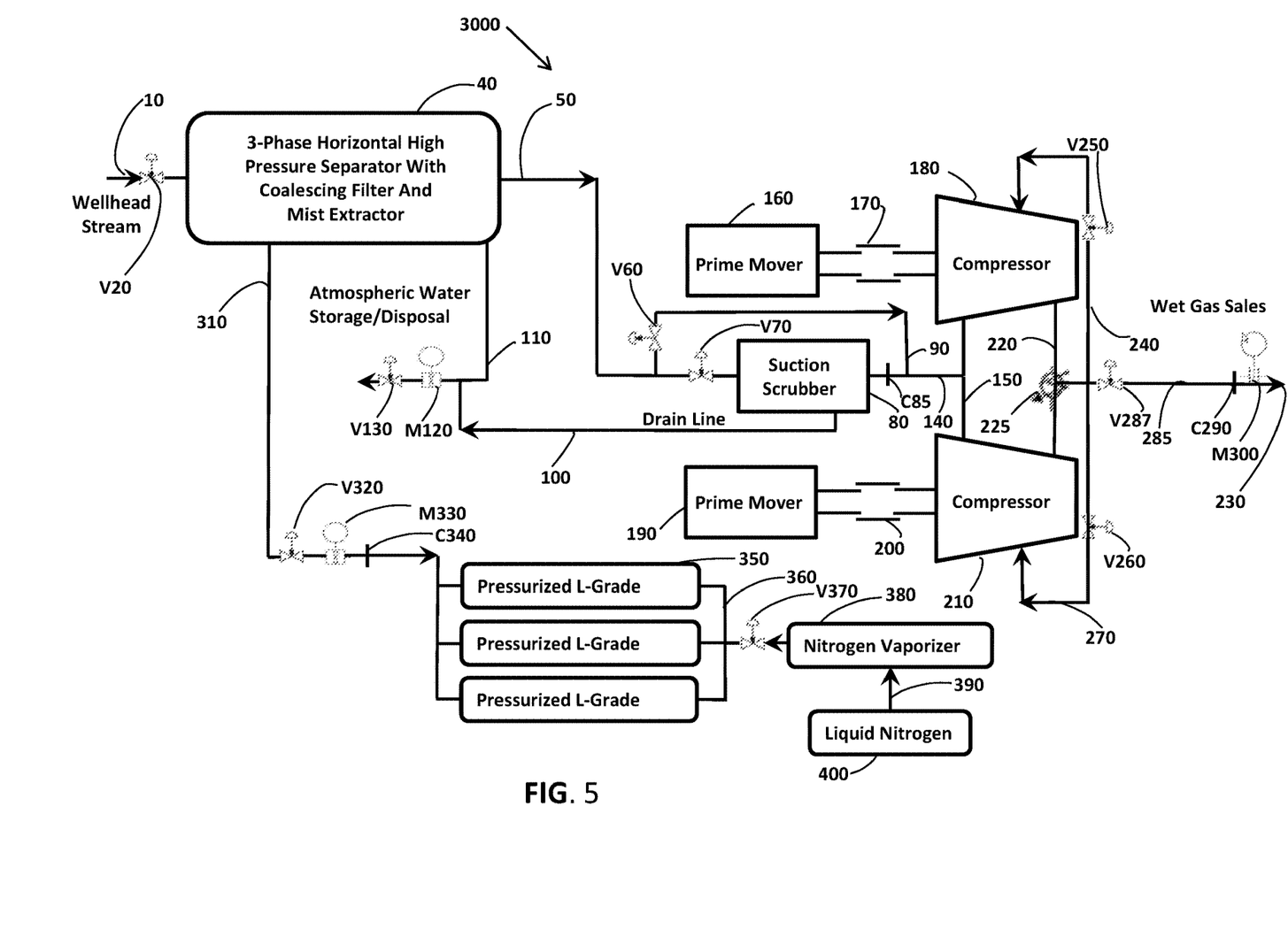
FIG. 5 shows a plan schematic of an L-Grade recovery system that can be used to create L-Grade for use in the embodiments described herein.

FIG. 5 shows one embodiment of an L-Grade recovery system 3000 for obtaining L-Grade that can be used with any of the embodiments described herein. The L-Grade recovery system 3000 is transported to the wellsite and connected to the hydrocarbon stream 10 (produced from one or more wells at the wellsite) via an inlet of a three-phase high pressure horizontal separator 40 with operating pressure and throughput rate controlled by control valve V20. The hydrocarbon stream 10 is separated by the separator 40 into three unique components including L-Grade, water, and natural gas via gravity segregation at a specified pressure.

Pressurized L-Grade exits the separator 40 via transfer line 310 that is controlled by control valve V320 and rate metered by turbine meter M330 to pressurized L-Grade storage vessels 350. Check valve C340 prevents back flow from the L-Grade storage vessels 350. The L-Grade storage vessels 350 are nitrogen blanketed by a nitrogen blanketing system comprising a nitrogen header 360, control valve V370, and liquid nitrogen storage tank 400. Liquid nitrogen from the storage tank 400 via line 390 is vaporized in a nitrogen vaporizer 380 and discharged through the control valve V370 to the nitrogen header 360, which distributes nitrogen into the L-Grade storage vessels 350. The L-Grade can subsequently be used as a carrier fluid and injected into a hydrocarbon bearing reservoir.

Water from separator 40 is transferred via line 110 to an atmospheric water storage and/or disposal facility on the oil and gas leases for example. The flow rate and pressure of the water from the separator 40 is controlled by valve V130 and metered by turbine meter M120.

Natural gas from the separator 40 is transferred via line 50 through control valve V70 and into a suction scrubber 80. Entrained liquids are removed from the natural gas stream by the suction scrubber 80 and transferred to the atmospheric water storage and/or disposal facility via drain line 100. The suction scrubber 80 can be by-passed by opening control valve V60, closing control valve V70, and allowing the natural gas stream to move through line 90.

A liquid free natural gas stream exits the suction scrubber 80 via line 140, flows through check valve C85, and is suctioned into a suction header 150 for distribution to natural gas compressors 180, 210. The compressors 180, 210 are driven by prime movers 160, 190 via power transfer couplings 170, 200, respectively, to pressurize the natural gas streams. The high pressure natural gas streams exit the compressors 180, 210 into a discharge header 220, and then are cooled by an aftercooler 225, flowed through check valve C290, and metered by an orifice meter M300 before transferring to a wet gas sales line 230 via transfer line 285. The pressurized natural gas stream can also be recycled by opening control valves V250, V260 and at least partially closing control valve V287 to cycle the pressurized natural gas stream back into the compressors 180, 210 via lines 240, 270.

While the foregoing is directed to certain embodiments, other and further embodiments may be devised without departing from the basic scope of this disclosure.

The invention claimed is:

1. A method of injecting a chemical additive into a hydrocarbon bearing reservoir located at a wellsite, comprising:
pumping a chemical additive from a chemical additive unit into a piping, wherein the chemical additive includes a surfactant, a non-ionic surfactant, a polymer, an acid, a nano-surfactant, a nano-polymer, a polymer coated nano-particle, a nano-solvent, and combinations thereof;
pumping an unfractionated hydrocarbon liquid mixture into the piping;
mixing the chemical additive with the unfractionated hydrocarbon liquid mixture in the piping to form a treatment fluid, wherein the unfractionated hydrocarbon liquid mixture is a by-product of a de-methanized hydrocarbon stream and comprises ethane, propane, butane, isobutane, pentane, and less than one percent methane by liquid volume;
pressurizing the treatment fluid with a pump;
pumping the treatment fluid into a cooler;
pumping a cooling agent into the cooler;
cooling the treatment fluid using the cooling agent; and then
pumping the treatment fluid into the hydrocarbon bearing reservoir.

2. The method of claim 1, wherein the cooling agent is liquid nitrogen.

3. The method of claim 1, wherein the cooling agent is carbon dioxide.

4. The method of claim 1, wherein the cooling agent is a non-ionic surfactant.

5. The method of claim 1, wherein the pressurizing of the treatment fluid with the pump is to a pressure of 250 psig or greater.

6. The method of claim 1, wherein the cooling of the treatment fluid using the cooling agent is to a temperature of 0 degrees Fahrenheit or lower, and further comprising freezing connate water located in the hydrocarbon bearing reservoir using the cooled treatment fluid, pumping additional treatment fluid into the hydrocarbon bearing reservoir, and diverting the additional treatment fluid using the frozen connate water to a selected location in the hydrocarbon bearing reservoir.

7. The method of claim 1, wherein the treatment fluid remediates paraffin located in the hydrocarbon bearing reservoir.

8. The method of claim 1, wherein the treatment fluid remediates asphaltene located in the hydrocarbon bearing reservoir.

9. The method of claim 1, further comprising injecting the treatment fluid into contact with condensate blockage located in the hydrocarbon bearing reservoir.

10. The method of claim 1, wherein the treatment fluid further includes a surfactant.

11. A method of injecting a chemical additive into a hydrocarbon bearing reservoir located at a wellsite, comprising:
pumping a chemical additive into a piping, wherein the chemical additive includes a surfactant, a non-ionic surfactant, a polymer, an acid, a nano-surfactant, a nano-polymer, a polymer coated nano-particle, a nano-solvent, and combinations thereof;
pumping an unfractionated hydrocarbon liquid mixture into the piping;
mixing the chemical additive with the unfractionated hydrocarbon liquid mixture in the piping to form a treatment fluid, wherein the unfractionated hydrocarbon liquid mixture is a by-product of a de-methanized natural gas stream and comprises ethane, propane, butane, isobutane, pentane, and less than one percent methane by liquid volume;
pressurizing the treatment fluid with a pump;
vaporizing a foaming agent with a vaporizer;
mixing the vaporized foaming agent with the treatment fluid to cool and generate a foamed treatment fluid; and then
pumping the foamed treatment fluid into the hydrocarbon bearing reservoir.

12. The method of claim 11, wherein the unfractionated hydrocarbon liquid mixture further includes condensate, water, carbon dioxide, nitrogen, and hydrogen sulfide.

13. The method of claim 11, wherein the foaming agent is liquid nitrogen.

14. The method of claim 11, wherein the foaming agent is carbon dioxide.

15. The method of claim 11, wherein the foaming agent is a non-ionic surfactant.

16. The method of claim 11, wherein the pressurizing of the treatment fluid with the pump is to a pressure of 250 psig or greater.

17. The method of claim 11, further comprising freezing connate water located in the hydrocarbon bearing reservoir using the foamed treatment fluid, pumping additional treatment fluid into the hydrocarbon bearing reservoir, and diverting the additional treatment fluid using the frozen connate water to a selected location in the hydrocarbon bearing reservoir.

18. The method of claim 11, further comprising injecting the foamed treatment fluid into contact with paraffin, asphaltene, or condensate blockage located in the hydrocarbon bearing reservoir.

* * * * *